United States Patent Office 2,790,264
Patented Apr. 30, 1957

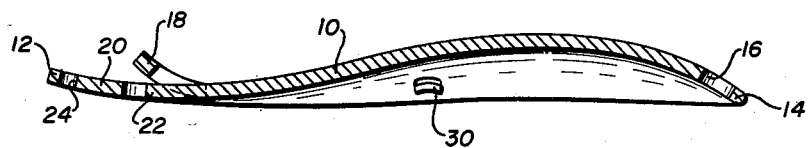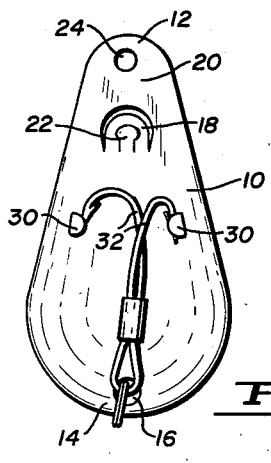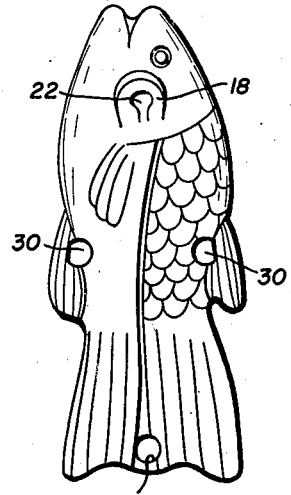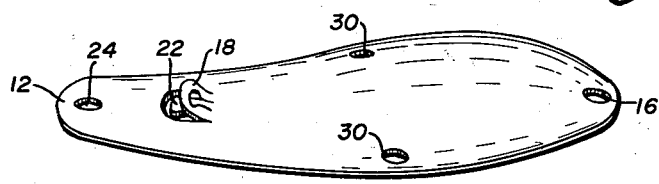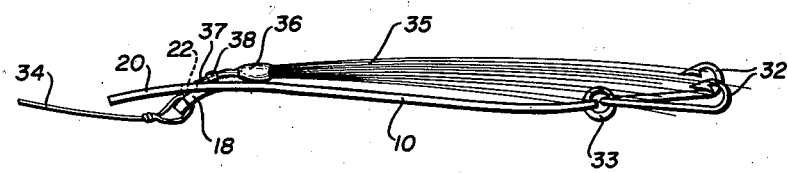

2,790,264

FISH LURE

William H. Rickard, Denver, Colo.

Application August 9, 1954, Serial No. 448,651

7 Claims. (Cl. 43—42.5)

This invention relates to fish lures, and more particularly to spoon-type lures which include a thin, curved body to which is attached a fishing line at one end and a fish hook or hooks at the other end. Specifically, the invention relates to a line connecting eyelet and streamer support cut from the body itself.

In general the present invention concerns improvements in fish lures made from sheet metal stock having a curved spoon shape to provide a desirable action of swimming and darting movements as the lure travels through the water. A U-shaped bail line attaching eyelet is punched or cut in the sheet metal stock at a point away from the leading edge so as to provide an extending deflecting plate. The curved configuration of the body causes the deflecting plate to be presented at an angle to the line of travel, thereby giving various lateral motions to the lure as it is moved out of travel alignment by the force of the water against the deflecting plate. In cutting the U-shaped bail from the lure, a peninsular protuberance or tongue remains centerwise of the cut-out bail. The eyelet bail is bent out of alignment with the body, or its cut-out position, leaving the tongue in its body aligned position undisturbed. This tongue or support is readily accessible for attaching a streamer, wiggler, or other flexible appendages to the lure. Such additions may be brightly colored rubber, plastic, flexible material strips or ribbons intended to provide movement for attracting fish. By utilizing the support of the present invention several distinct advantages are gained. The streamer is attached to the lure in a position so that the ends of the streamer cover the hooks. This prevents the fish from striking at the streamer and missing the hooks. Also, the streamer being connected near the front end of the body permits the body to move freely along its erratic path and at the same time the streamer follows a free flowing path, more or less following the lure. The streamer, therefore, moves freely without substantially interfering with the lure, providing a substantially unhindered movement of the lure. The free moving streamer and the unhindered movement of the lure provides an almost irresistible bait for the fish.

Included among the objects and advantages of the present invention is a novel U-shaped bail line attaching eyelet in a sheet metal lure. The eyelet is positioned away from but in proximity to the leading edge of a spoon-shaped lure to provide a front section which rides at an angle to the line of travel and acting as a deflection plate for causing lateral or erratic movement of the lure as it travels through the water. The cut-out eyelet leaves a tongue which is adapted as a streamer support to position a streamer on the lure, covering the hooks to thereby catch fish striking at the lure. The support provides a novel connection between the lure and the streamer. The support holds the streamer so as to provide free movement of the streamer and substantially unhindered movement of the lure.

These and other objects and advantages of the invention may be ascertained in more detail by the following description and appended illustrations, in which:

Figure 1 is a cross sectional elevation of the device according to the invention, illustrating the position of the line attaching eyelet on the body, Figure 2 is a top plan view of a fish lure illustrating one use of the invention with a spoon-shaped lure, Figure 3 is a top plan view of a modified lure, illustrating the eyelet in use on a fish-shaped lure, Figure 4 is a top perspective view of a spoon-shaped lure, illustrating the position of the eyelet in relation to the leading edge of the lure, and the position of the streamer support, and Figure 5 is a side elevation of a fish lure illustrating the attachment and the position of the streamer to the lure.

The lure illustrated in Figure 1 comprises a curvous body 10 having a leading edge 12 and a rear edge 14. An eyelet or hole 16 cut or punched through the thin body near the trailing edge of the lure provides means for connecting a fish hook or a gang of hooks. A U-shaped bail or eyelet 18 is cut from the body of the lure at a point away from the leading edge 12 so as to leave a deflecting plate 20 in front of the line connecting eyelet 18. A tongue 22 remains when the U-shaped bail is cut from the body, and by shaping the internal cut of the U-shaped bail a headed tongue or support 22 remains secured to the body. The tongue may be used for supporting a streamer or wiggler or the like. A conventional line attaching eyelet 24 may be punched adjacent the leading edge of the lure, to provide a lure with two positions for securing to a line. The bail eyelet 18, when the line is attached to the eyelet as shown in Fig. 5 there remains an extending body portion which acts as a deflecting plate 20, is satisfactory for use in still water or in slowly moving waters when the lure is retrieved slowly. In fast-moving water, more satisfactory results may be obtained by utilizing the conventional eyelet 24 at the leading edge of the lure, since there is no deflecting plate in front of the eyelet 24.

In the device as illustrated, a pair of hook holders 30 are illustrated. The hook holders hold the hooks of the lure in position against the body so that they will not tangle with other hooks when the lure is in a storage space with other hooks and lures. The hook holders are described and claimed in my Patent No. 2,597,035, patented May 20, 1952.

The lure illustrated in Figure 2 is a standard spoon or shoehorn-type lure, while the lure illustrated in Figure 3 has a fish-outline shape. In both cases, the lure is curved laterally or cupped and has an S-shape. The lure is adapted to plane with the leading edge pointed downwardly, as illustrated in Fig. 5. When the lure is planing in the water, the leading edge is pointed downwardly and the hooks may be pointed either up or down. This is true whether the lure is attached to the line by means of a conventional hole such as 24 or the bail-shaped eyelet 18 of the present invention. This position, when the line is connected to eyelet 18, provides for a deflection plate 20 which extends downwardly and causes lateral, darting, diving, and similar fish-like movements of the lure as it is pulled through the water. The force of the water against the deflection plate causes such lateral movements of the lure, and gives the lure a simulated action of a swimming fish with darting movements similar to a fish.

In the device illustrated in Figure 5, the lure 10 having attached gang hooks 32, by means of an attaching ring 33, is shown in its planing position in the water. A fish line 34 is connected to the eyelet 18, and as the lure travels through the water, the deflecting plate 20 provides the erratic and darting movement of the lure. A streamer 35, composed of strips of brightly colored plastic, rubber, and similar flexible material secured together by means of a tie 36, is attached to the support 22 by means of a loop 37. The loop 37 is placed around the support 22, and a small collar 38 is pulled up toward it to tighten the loop thereon. The loop 37 is, preferably, a rubber loop retained by a plastic or rubber collar 38. This arrangement provides a quick and easy fastening for the streamer on the lure. However, other types of fasteners may be used, for example, a short rubber loop may be utilized in which case the short loop is maintained over the support by means of the elasticity of the rubber. Also, string or thread or other type of connection may be used. It is also preferable to utilize a fairly long loop over the support so that the streamer can have substantially free action in relation to the lure. The streamer 35 should preferably end at or about the points of the hooks 32, so that fish striking at the streamer will strike the hooks and be caught thereby. The streamer freely flowing above the lure, which is running with substantially unhindered action, provides an attractive lure for enticing fish.

The support 22 may be a straight sided protuberance, or by indenting the sides a support with a head is formed, as shown. The headed support provides a somewhat more secure support for a loop of a streamer. Other types of supports may be left from cutting out the bail, by changing the internal configuration of the cut or punch.

While the invention has been illustrated by reference to specific lures, there is no intent to limit the invention to the details described, except insofar as set forth in the following claims.

I claim:

1. In a fish lure having an elongated body, a substantially U-shaped bail having its extremities secured to said body, said bail being adapted for use as a line attaching eyelet, said eyelet depending from said body and bent at an angle thereto, and a tongue depending from said body centerwise of said bail, said tongue being secured to said body between the extremities of said U-shaped bail.

2. In a fish lure having an elongated metallic body, a substantially U-shaped bail having its extremities secured to said body, said bail being adapted for use as a line attaching eyelet, said eyelet depending from said body and bent at an angle thereto, and a tongue adapted for use as a streamer support secured to said body centerwise of said bail, said support depending from said body substantially in the plane thereof between the extremities of said U-shaped bail.

3. A fish lure comprising a thin body of substantially S-shape, a U-shaped bail integral with and depending from said body, said bail being adapted for use as a line attaching eyelet, said eyelet being spaced from and in proximity to the leading edge of said body, and a tongue secured to and depending in alignment from said body centrally of said bail.

4. A fish lure comprising a thin, metal body of substantially S-shape, a substantially U-shaped bail integral with and depending at an angle from said body, said bail being adapted for use as a line attaching eyelet, said eyelet being spaced from and in proximity to the leading edge of said body, and a tongue adapted for use as a streamer support depending in planar alignment from said body centrally of said bail.

5. A fish lure comprising a thin S-shaped body adapted to plane in a normal position with the leading edge directed downwardly, a U-shaped bail adapted for use as a line attaching eyelet integral with and depending from said body, said eyelet being spaced from and in proximity to the leading edge of said body whereby the body portion between said eyelet and the leading edge forms an extending deflecting plate, said eyelet being bent downwardly in the direction of and out of the plane of the deflecting plate, and a tongue adapted for use as a streamer support depending from said body centrally of said bail.

6. A fish lure comprising a thin, metal S-shaped spoon-type lure adapted to plane in a normal position with its leading edge directed downwardly, a substantially U-shaped bail integrally secured by its extremities to said body and depending out of the plane thereof, said bail being spaced from and in proximity to the leading edge of said body whereby the body portion between said bail and the leading edge forms an extending deflecting plate, and a tongue adapted for use as a streamer support depending in planar alignment from said body centrally of said bail.

7. A fish lure comprising a thin, metal S-shaped body adapted to plane in a position with its leading edge directed downwardly, a pair of line attaching eyelets in the forward portion of said lure, spaced apart so that the body portion therebetween forms a downwardly directed deflecting plate, one of said eyelets being a portion of the body member, disposed adjacent the leading edge thereof, provided with a hole, the other eyelet being a U-shaped bail integrally secured by its extremities to said body and depending downwardly in the same direction as the deflecting plate, said bail eyelet being spaced from and in proximity to the leading edge of said body, and a tongue adapted for use as a streamer support depending from said body centrally of said bail.

References Cited in the file of this patent

UNITED STATES PATENTS

| | | |
|---|---|---|
| 1,123,717 | Fey | Jan. 5, 1915 |
| 1,862,917 | Anderson | June 14, 1932 |
| 2,527,064 | Hufnagel | Oct. 24, 1950 |
| 2,535,211 | Jelinek | Dec. 26, 1950 |
| 2,608,787 | Krogue | Sept. 2, 1952 |